April 8, 1969

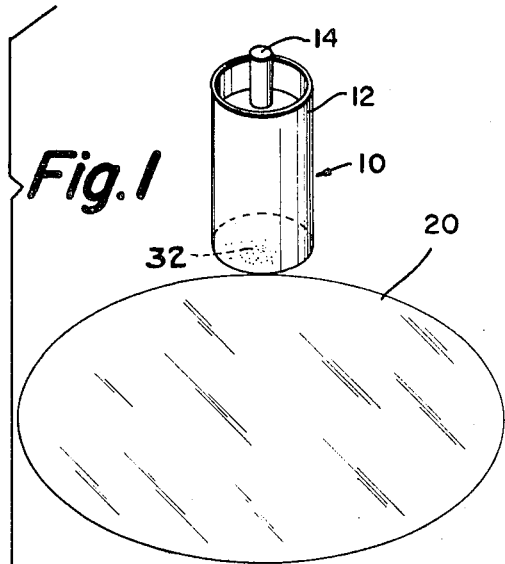
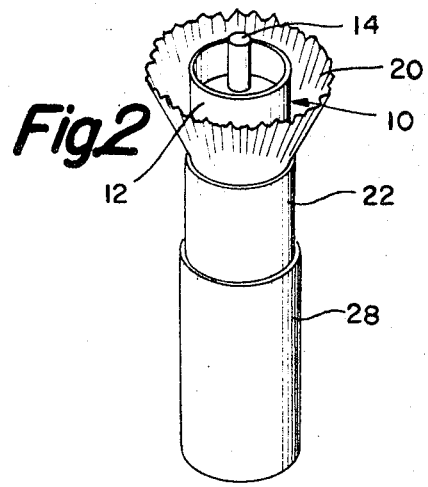
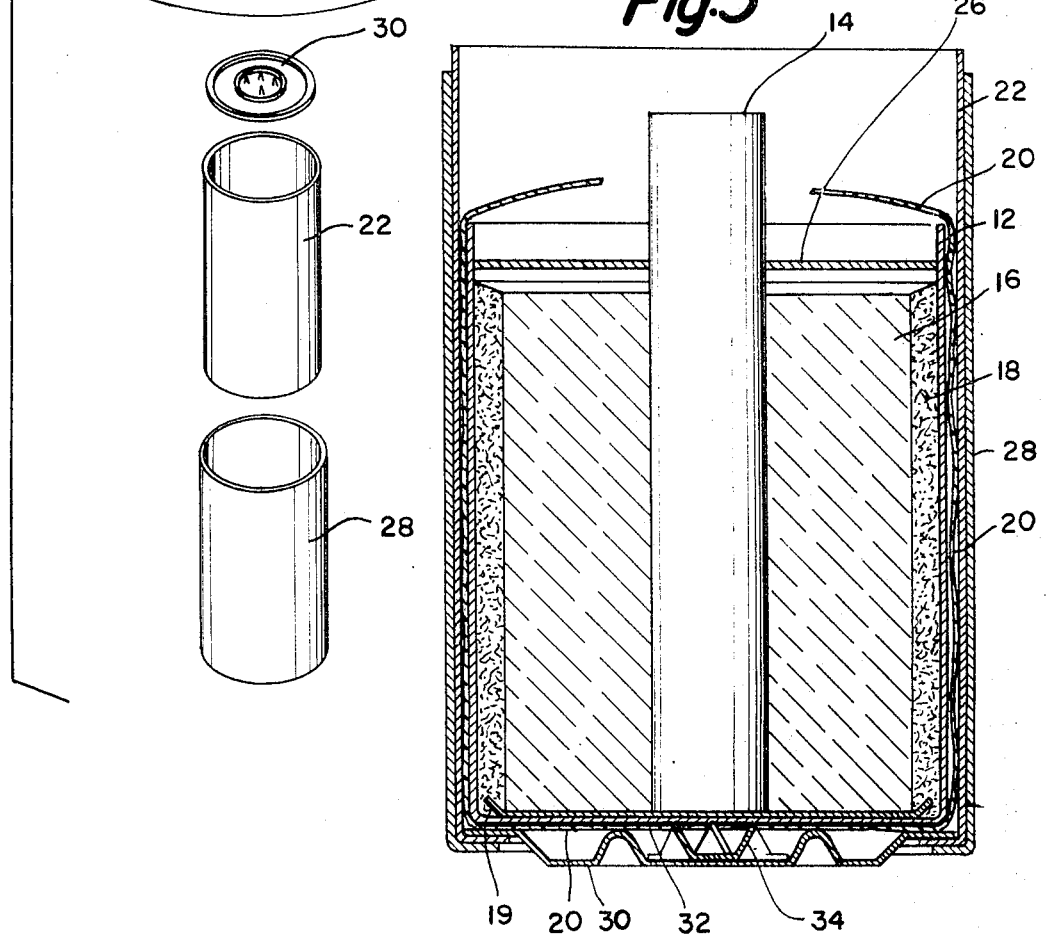

C. E. ANDERSON 3,437,530

LEAK-RESISTANT DRY CELL

Filed Feb. 24, 1967

3,437,530
LEAK-RESISTANT DRY CELL
Charles E. Anderson, Madison, Wis., assignor, by mesne assignments, to ESB Incorporated, Philadelphia, Pa., a corporation of Delaware
Filed Feb. 24, 1967, Ser. No. 618,443
Int. Cl. H01m 1/02, 21/00
U.S. Cl. 136—132                                     16 Claims

ABSTRACT OF THE DISCLOSURE

A paper or metal jacketed primary dry cell having a flexible plastic enclosure between the cell and the jacket to contain the liquid exudate created when the cell is discharged.

Background of the invention

The Le Clanché dry cell has gone through many years evolution of improvements in an attempt by manufacturers to prevent leakage from the cell during and after its use. Despite the many proposals, however, that have been advanced, there still remains a need for a more leak-resistant dry cell. This need is amplified by the use of such flashlight type cells in clocks, toys, radios, and other devices whose relative value is great compared with the cells; in such devices cell leakage can be an expensive problem.

To contain the exudate it has become customary to place some sort of jacket around the outside of the cell, the jackets being either of paper or metal construction. Typical of the paper jackets or containers in commercial use is one made from bibulous paper which has provided on its inner surface a liquid-proof liner of plastic film. The principal difficulty, however, with such paper containers is that they do not possess the mechanical strength which is desirable and so may often be damaged or even destroyed by the pressure which builds up within the cell. To achieve greater mechanical strength manufacturers have used metal jackets or containers, placing an electrolyte impervious sleeve, which might for example be made from laminated paper and asphalt or plastic, between the consumable zinc can of the cell and the outer metal container.

Summary of the invention

This invention, which can be adapted with either paper or metal containers, provides a bag-like plastic film enclosure with no seams which fits around the outside of the cell but inside the container and which is sealed so as to be leakproof. Sealing may be conveniently made by embedding the edge of the enclosure in a sealing compound such as hot asphalt. In folding the enclosure about the cell, portions of the enclosure overlap and form useful flexible and expandable depositories for the exudate.

Brief description of the drawings

The drawings will show only the instance where the container or jacket surrounding the cell is metal, for in this instance there is the problem of electrically insulating the container from the cell, a problem which is not encountered when a paper container is used. Following discussion of various alternative constructions all of which employ metal containers there will be discussion of the constructions when the container is paper; in this latter construction no additional views will be referred to, for the modifications necessary can be adequately described without such extra views.

FIGURE 1 is an exploded view showing one arrangement of parts and a method of assembling them;

FIGURE 2 is a view of the parts shown in FIGURE 1 in partially-assembled position;

FIGURE 3 is a view of the parts of FIGURES 1 and 2 in position at a later stage of assembly, before the plastic enclosure is sealed, and also shows one alternate bottom construction;

Description of the preferred embodiment

Figure 4:
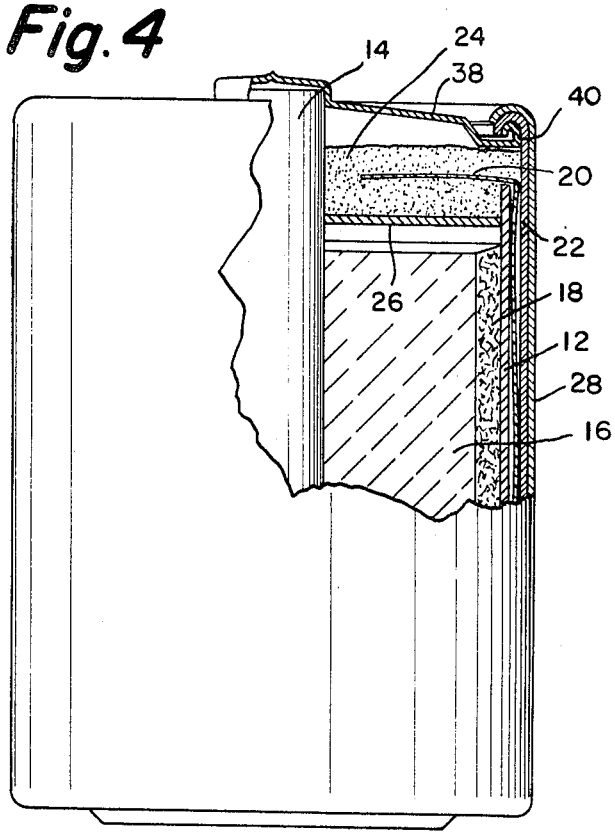
FIGURE 4 shows the parts illustrated in FIGURES 1 through 3 after the plastic enclosure has been sealed, and shows also details of top and bottom constructions of the jacketed cell.

What is referred to as the "cell" can be easily identified in FIGURES 1 and 3. The cell 10 consists of a consumable metallic can 12 such as zinc which serves as one electrode, a porous carbon pencil 14 which serves as the second electrode, a suitable depolarizer mix 16 inside the can 12 and around the pencil 14, and an immobilized electrolyte 18 which may be suitably made from conventional wheat flour paste with additives. In lieu of the paste a conventional paper separator saturated or coated with such a paste may alternatively be used. Also inside the can 12 and at the bottom of the can is an insulator cup and/or washer 19 which serves to insulate the bottom of the can 12 from electrical shorts which would occur if the depolarizer mix 16 and/or the carbon pencil 14 should come into contact with the can 12. All of these are well known in the dry cell art. This definition of the term "cell" is one which is frequently used in the dry cell art, and is distinguished from another meaning of the same term also used in the dry cell art, which latter meaning also includes the jacket or container surrounding the components identified above.

The cell 10 is to be wrapped and sealed in a plastic enclosure 20. To achieve this result a piece of thin plastic film material which may be circular such as polyvinylchloride or polyethylene may be placed between the cell 10 and a sleeve 22 made from paper or other suitable material, as shown in FIGURE 1. With a plastic 20 centered beneath the cell 10 and sealant 32 (to be described later) applied to the bottom of the cell, the cell 10 is inserted into the sleeve 22 causing the plastic 20 to be folded up around the outside of the cell 10, as shown in FIGURE 2. The diameter of the circular plastic 20 is such that when the cell 10 has completely entered the sleeve 22, all portions of the edge of the plastic will extend above the top of the can 12.

When the plastic 20 is folded up and around the outside of the cell 10, folds or overlapping portions of the plastic 20 necessarily develop. These folds are quite advantageous, and constitute one of the important benefits provided by this invention, for they provide areas of expansion to accommodate the exudate and gases, the products of cell discharge. The folds act as bellows to expand in response to the pressure formed by the exudate and gases. It is important to note that for this purpose the plastic 20 must be free from the sides of the cell 10 rather than adhering to the cell, and so dipped or sprayed plastic coatings would not function in an equivalent manner.

To make the plastic 20 leakproof, the top of the plastic is to be sealed over the top of the can 12 and around the carbon pencil 14. One convenient method of accomplishing this result is to pour a sealing compound 24 such as hot melted asphalt over the top of the plastic 20. Prior to this, however, it is desirable to insert a supporting washer 26 which may be placed over the pencil 14 so that the washer 26 can provide support for the sealing compound 24; by properly spacing the washer 26 above the top of the mix 16 there is left a clearance space inside the can 12 which is desirable to accommodate the gases and exudate which form and expand upon discharge of the cell. With the washer 26 thus in place, the edges of the plastic 20 are folded inward in the direction of the center of the cell 10, such as by a stream of hot air which will both force the edges inward and soften the plastic so that it will momentarily remain in its inward position. With the washer 26 and the plastic 20 thus in position, as shown in FIGURE 3, the sealing compound 24 may be poured. The sealing compound 24 must be of sufficient depth to surround the edge of the plastic 20, and must be of proper temperature and consistency when being poured so that it will flow easily into all the many spaces in and around the plastic 20 and maintain all portions of the edge of the plastic 20 embedded in the compound 24 while the compound 24 is cooling. The sealing compound 24 is shown in place in FIGURE 4.

As an alternative construction, a material which will adhere to itself upon the application of heat or other means may be used for the plastic enclosure 20. Such a plastic enclosure 20 may be sealed over the top of the can 12 and around the carbon pencil 14 without the application of an additional sealing compound. The washer 26 could likewise be eliminated in this instance if desired, or it could still be used if needed for other purposes.

As was stated above in the paragraph introducing the description of the drawings, the drawings show the jacket or container as being metal. The cell 10, plastic 20, bottom closure member 30, and sleeve 22 may be conveniently inserted into the container 28 at the same time and in the same process as the cell 10 and plastic 20 are being inserted into the sleeve 22. See FIGURES 1, 2, and 3.

Since the can 12 which is to serve as one electrode of the cell 10 is to be sealed inside the plastic enclosure 20, it is necessary that there be some means of electrical connection extending through the plastic enclosure 20 to make contact with the cell 10. Care must be taken not to permit exudate to escape at the locality where such electrical connection is made, however. Also the electrical connection with the cell 10 must be so arranged that the cell can be electrically connected with other cells or with the device in which it is to be used. In FIGURE 3 there is shown a bottom closure member 30 which may serve as the necessary electrical connector or terminal for the jacketed cell 10. This bottom closure member 30 is conveniently inserted inside and at the bottom of the sleeve 22 before the cell 10 and plastic 20 are inserted into the sleeve 22; FIGURE 1 shows how the bottom closure member 30 might first be inserted. Both the sleeve 22 and the metal container 28 have their lower edges curved inward as shown in FIGURE 3 so as to provide a shelf or support for the bottom closing member 30 while at the same time leaving the bottom closing member 30 exposed for electrical contact with other cells or devices. As shown in FIGURE 3 a deposit of adhesive sealant 32 which is impervious and resistant to electrolyte and exudate and which may be applied to the bottom exterior surface of the can 12 or on the upper surface of the plastic 20 is used as an adhesive between bottom area of the can 12 and plastic enclosure 20. The bottom closure member 30 shown in FIGURE 3 is provided with one or more sharp prongs 34 which project upward and penetrate the plastic enclosure 20 and the adhesive sealant 32 to make contact with the bottom of the can 12. The adhesive sealant 32, in addition to preventing exudate from getting outside the plastic enclosure 20, also serves to protect the prongs 34 from being corroded by the exudate as well as preventing entry of substances from outside the jacketed cell which might cause corrosion of the cell 10.

Figure 5:
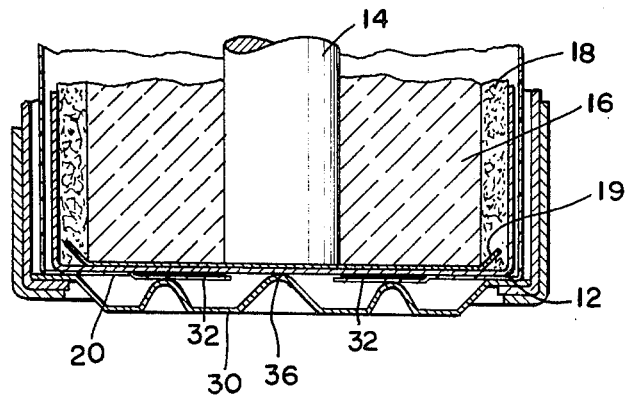
FIGURE 5 shows a bottom construction which is alternative to the one appearing in FIGURE 3.

As an alternative to the bottom construction shown in FIGURE 3 there is shown in FIGURE 5 a somewhat different bottom closure member 30 having an upwardly extending projection 36 arranged to make contact with the bottom of the can 12. In this construction the plastic enclosure 20 is provided with an opening beneath the cell 10 to permit direct contact between portion 36 of the bottom closure member 30 and the bottom of the can 12. A ring of adhesive sealant 32 located between the bottom exterior surface of the can 12 and the upper surface of the plastic enclosure 20 and extending around the opening in the plastic 20 will prevent the escape of the exudate.

While there have been shown in the drawings two alternative constructions in which the closure member 30 projects in some manner through the plastic enclosure 20 to make electrical contact with the cell 10, the construction can obviously easily be reversed; that is, a member having one or more sharp prongs might be attached to the outside bottom of the can 12 but inside the plastic 20 so that the prongs penetrate the plastic 20 in the other direction to make contact with the closure member 30. Alternatively, the member attached to the outside bottom of the can might have a downwardly extending projection arranged to project through an opening in the plastic 20 to make electrical contact with the closure member 30, with a ring of adhesive sealant surrounding the opening on the inside of the plastic.

While there are thus shown and described several different bottom closure constructions which will be satisfactory, it is preferred to use the bottom closure member 30 having the upwardly projecting prongs 34 shown in FIGURE 3. This construction avoids the problem of centering the cell 10 over an opening in the plastic 20 which is encountered when the construction of FIGURE 5 is used. Likewise, with a given spring force acting between the closure member 30 and the cell 10 when the cell 10 is finally jacketed, there is greater pressure between the prongs 34 and the bottom of the can 12 than exists between the projection 36 and the can 12, due to the smaller total surface area of the prongs 34 making contact; this leads to a better electrical connection as well as reduced electrical resistance between the cell 10 and the bottom closure member 30. Also, with a smaller opening in the plastic enclosure 20 there is less opportunity for exudate to escape and foreign substances to enter in the event that the adhesive sealant 32 should become not totally effective.

While the sides of the metal can 12 are consumed as the cell 10 is discharged, the insulator cup 19 inside the can 12 also insulates the bottom of the can 12 from the chemical reactions occurring during cell discharge, and so some of the bottom of the can 12 normally remains even when the cell is completely discharged. Thus during discharge there continues to be a bottom of the can 12 with which the bottom closure member 30 may make contact.

It will be apparent that there are both upper and lower practical limits on the thickness of the plastic enclosure 20. Because the plastic 20 necessarily develops folds along the side walls of the cell 10, the clearance required between the cell 10 and the sleeve 22 (shown exaggerated in the drawings) must be several times the thickness of the plastic 20; to minimize this required clearance, it is desirable to use a thin plastic enclosure 20. On the other hand, the enclosure 20 must be of sufficient thickness to withstand both the manufacturing processes and the pressures arising during cell discharge, and so a greater thickness is desirable from this viewpoint. A plastic enclosure 20 having a single layer thickness of 0.0020 inch appears to be satisfactory.

Throughout this discussion so far, reference has been made to the sleeve 22. As stated earlier, this sleeve has been used with cells having a metal jacket or container, where it has served several purposes simultaneously. In addition to acting as a liquid-proof barrier to hold in the exudate and prevent corrosion of the devices in which the cells were being used, the paper sleeve also protected the metal jacket from corrosion as well as providing electrical insulation between the top and bottom terminals of the cell and metal jacket. Although the plastic enclosure 20 will now contain the exudate, there remains the problem of adequate electrical insulation. The use of the plastic enclosure 20 does make possible several alternative forms of construction all of which provide electrical insulation, and these will now be discussed.

In FIGURE 4 the sleeve 22 is shown being outside the plastic enclosure 20. In that figure a top closure 38 which may be formed of tin plated steel and which is provided with a beaded peripheral edge 40 is shown fitting over the top of the carbon pencil 14 where it functions as the second electrical terminal of the jacketed cell; such top closures are conventional in the dry cell art, where they have been in use for many years. In this instance the top edges of the metal container 28 and the paper sleeve 22 are curled inwardly over the top of the beaded edge 40 of the top closure 38 and serve to hold the top closure 38 in position. This construction has been in commercial use for some time, and can be continued using the plastic enclosure 20 of this invention.

Figure 6:
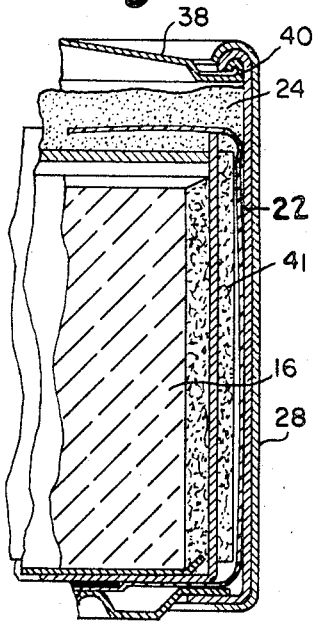
FIGURE 6 shows a modification of the construction appearing in FIGURE 4.

It might in some instances be desirable to have a paper sleeve in immediate contact with the can 12 of the cell 10, that is, have the sleeve inside the plastic enclosure 20. Such a sleeve 41 is shown in FIGURE 6. In such a case the problem of electrical insulation could continue to be met with another sleeve 22 outside the plastic enclosure 20, arranged as in FIGURE 4. Such a construction is shown in FIGURE 6.

Figure 7:
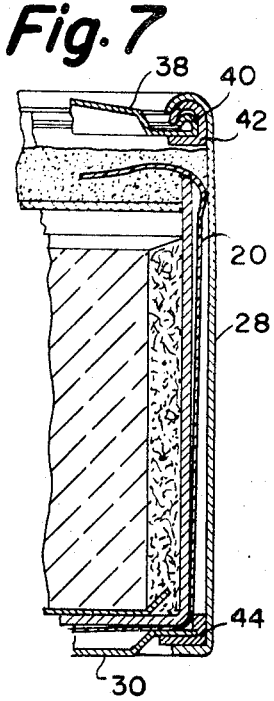
FIGURE 7 shows an alternative to the construction appearing in FIGURES 4 and 5.

Since the sleeve 22 is no longer required to contain exudate, the sleeve 22 can be omitted if proper electrical insulation is provided around the metal container 28. Such a construction is shown in FIGURE 7, where insulation between the container 28 and the top closure 38 is provided by an insulating washer or grommet 42 which rests on the top of the poured sealing compound 24. At the bottom, a second grommet 44 may be used to insulate the bottom closure member 30 from the container 28.

Obviously the sleeve 41 shown in FIGURE 6 can be used simultaneously with the grommets 42 and 44 shown in FIGURE 7 if desired.

While it is thus possible to eliminate the sleeve 22 by use of this invention, it may be desirable to continue using the sleeve 22 for several reasons. First, existing manufacturing equipment can be used without modification to crimp the top and bottom edges of the container 28, thus avoiding additional capital expenditures. Second, the sleeve 22 will continue as a reserve liquid-proof barrier which would be useful in the event a hole should somehow develop in the plastic enclosure 20. Next, there is a seam inside the metal container 28 which is required to join the edges of a sheet of metal in order to create a cylinder, and this seam might prove hazardous to the plastic enclosure. Should the seam tear a hole in the plastic enclosure 20 while the enclosure 20 and cell 10 are being inserted into the container 28, the enclosure 20 would no longer be leakproof. The smooth surface offered by the sleeve 22 will reduce this hazard. And finally, the two grommets 42 and 44 which would be required if the sleeve 22 is eliminated may be more expensive to construct and assemble in the jacketed cell that is the sleeve 22.

Regardless of the construction used at the top and bottom edges of the container 28, when the entire assembly of the jacketed cell is completed, there must remain sufficient axial compressive force so that there will be proper electrical contact between the top closure 38 and the carbon pencil 14, as well as between the closure member 30 and the bottom of the metal can 12. After the top closure 38 is in place an external closing pressure is exerted against the top closure 38 in the direction of the bottom of the cell 10, and while this pressure is still being exerted the top edge of the metal container 28 is curled inward. The curled top edge which acts against the top closure 38, together with the bottom edge of the metal container 28 which acts against the bottom closure member 30, will supply the necessary compressive force after the pressure is removed.

It was stated earlier that this invention could be used with a paper container 28 as well as one made from metal. That this is so can be seen from FIGURE 7. All that is necessary is to substitute a paper container for the metal one appearing there, in which case the grommets 42 and 44 will no longer be necessary. Any of the several forms of closing the top and bottom of the jacket which are in conventional use today with paper jackets could then be easily used. Since it is believed that one skilled in the dry cell art can easily see from the discussion above how the invention may be adapted with paper jackets or containers, no additional views or drawings are considered necessary.

The present invention has been illustrated by a widely used form of construction known as the Le Clanche type wherein a carbon or graphite pencil or pole constitutes one electrode and a zinc cup constitues the other electrode of opposite polarity. It should be understood that the advantages of the present invention are not restricted to cells of such construction, or even of the Le Clanche system. Thus the cup electrode of the present invention may be of metal other than zinc or may, if desired, be carbonaceous or graphitic in composition. The pencil electrode need not be of carbon or graphite but may be of some material such as zinc or some other metal of electro-chemical reaction with the cup electrode. The pencil electrode may be of any desired shape. With such changes in the electrodes it will be understood that suitable depolarizing materials and electrolyte solutions may be employed in each instance as is understood in the art.

I claim:
1. A leak-resistant jacketed dry cell comprising:
   (a) a dry cell;
   (b) a container around the dry cell;
   (c) a plastic enclosure placed around the cell and being inside the container, the plastic enclosure having expandable folds along the side of the dry cell to accommodate the products of cell discharge and being folded and sealed over the top of the cell;
   (d) a deposit of adhesive sealant inside the plastic enclosure, being between the bottom of the cell and the enclosure;
   (e) a bottom closure member held in position between the bottom of the cell and the container and making electrical contact with the cell; and
   (f) a top closure being held in position over the top of the cell by the container and making electrical contact with the cell.

2. The leak-resistant jacketed dry cell of claim 1 in which the bottom closure member is provided with at least one prong to extend through the plastic enclosure and make electrical contact with the cell.

3. The leak-resistant jacketed dry cell of claim 1 in which the plastic enclosure is provided with an opening so as to permit the bottom closure member to make electrical contact with the dry cell.

4. The leak-resistant jacketed dry cell of claim 1 together with a member which is situated inside the plastic enclosure, is attached to the outside bottom of the cell, and is provided with at least one prong to extend through the plastic enclosure to make electrical contact with the bottom closure member.

5. The leak-resistant jacketed dry cell of claim 1 in which the plastic enclosure is provided with an opening beneath the cell, together with a member which is situated inside the plastic enclosure, which is attached to the outside bottom of the cell, and which extends through the opening in the plastic enclosure to make electrical contact with the bottom closure member.

6. The leak-resistant jacketed dry cell of claim 1 wherein the container around the dry cell is constructed from paper.

7. The leak-resistant jacketed dry cell of claim 1 wherein the container around the dry cell is constructed from metal, together with an electrically nonconductive sleeve situated between the container and the plastic enclosure.

8. The leak-resistant jacketed dry cell of claim 1 wherein the container around the dry cell is constructed from metal, together with a pair of electrically nonconductive grommets, one being between the bottom closure member and the metal container and the other being between the top closure and the metal container.

9. A leak-resistant jacketed dry cell comprising:
(a) a dry cell;
(b) a supporting washer at the top of the dry cell;
(c) a container around the dry cell;
(d) a plastic enclosure placed around the cell and being inside the container, the plastic enclosure having expandable folds along the side of the dry cell to accommodate the products of cell discharge and having the edge extending toward the center of the cell and over the supporting washer;
(e) a deposit of sealing compound on top of the cell and around the edge of the plastic enclosure so as to seal the plastic enclosure;
(f) a deposit of adhesive sealant inside the plastic enclosure, being between the bottom of the cell and the enclosure;
(g) a bottom closure member held in position between the bottom of the cell and the container and making electrical contact with the cell; and,
(h) a top closure being held in position over the top of the cell by the container and making electrical contact with the cell.

10. The leak-resistant jacketed dry cell of claim 9 in which the bottom closure member is provided with at least one prong to extend through the plastic enclosure and make electrical contact with the cell.

11. The leak-resistant jacketed dry cell of claim 9 in which the plastic enclosure is provided with an opening so as to permit the bottom closure member to make electrical contact with the dry cell.

12. The leak-resistant jacketed dry cell of claim 9 together with a member which is situated inside the plastic enclosure, is attached to the outside bottom of the cell, and is provided with at least one prong to extend through the plastic enclosure to make electrical contact with the bottom closure member.

13. The leak-resistant jacketed dry cell of claim 9 in which the plastic enclosure is provided with an opening beneath the cell, together with a member which is situated inside the plastic enclosure, which is attached to the outside bottom of the cell, and which extends through the opening in the plastic enclosure to make electrical contact with the bottom closure member.

14. The leak-resistant jacketed dry cell of claim 9 wherein the container around the dry cell is constructed from paper.

15. The leak-resistant jacketed dry cell of claim 9 wherein the container around the dry cell is constructed from metal, together with an electrically nonconductive sleeve situated between the container and the plastic enclosure.

16. The leak-resistant jacketed dry cell of claim 9 wherein the container around the dry cell is constructed from metal, together with a pair of electrically nonconductive grommets, one being between the bottom closure member and the metal container and the other being between the top closure and the metal container.

References Cited

UNITED STATES PATENTS

| 1,623,719 | 4/1927 | Olaneta | 136—132 |
| 3,202,549 | 8/1965 | Urry | 136—132 |

FOREIGN PATENTS 704,710  2/1954  Great Britain.

A. B. CURTIS, *Primary Examiner.*

D. L. WALTON, *Assistant Examiner.*

U.S. Cl. X.R.

136—133, 134